(12) United States Patent
Lilly et al.

(10) Patent No.: US 9,128,857 B2
(45) Date of Patent: Sep. 8, 2015

(54) FLUSH ENGINE (71) Applicant: Apple Inc., Cupertino, CA (US)

(72) Inventors: Brian P. Lilly, San Francisco, CA (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 13/734,444

(22) Filed: Jan. 4, 2013

(65) Prior Publication Data
US 2014/0195737 A1 Jul. 10, 2014

(51) Int. Cl.
*G06F 12/00* (2006.01)
*G06F 12/08* (2006.01)

(52) U.S. Cl.
CPC ........ *G06F 12/0891* (2013.01); *G06F 12/0811* (2013.01); *G06F 12/0864* (2013.01)

(58) Field of Classification Search
CPC ............ G06F 12/0891; G06F 12/0864; G06F 12/0811
USPC ........................................................ 711/122
See application file for complete search history.

(56) References Cited

U.S. PATENT DOCUMENTS

| 5,907,853 A | 5/1999 | Jacobs et al. |
| 6,418,515 B1 | 7/2002 | Kurosawa |
| 6,457,087 B1 | 9/2002 | Fu |
| 6,976,128 B1 | 12/2005 | Williams et al. |
| 2009/0024799 A1* | 1/2009 | Jahagirdar et al. ............ 711/130 |

* cited by examiner

*Primary Examiner* — Matthew Bradley
(74) *Attorney, Agent, or Firm* — Meyertons, Hood, Kivlin, Kowert & Goetzel, P.C.

(57) ABSTRACT

Techniques are disclosed related to flushing one or more data caches. In one embodiment an apparatus includes a processing element, a first cache associated with the processing element, and a circuit configured to copy modified data from the first cache to a second cache in response to determining an activity level of the processing element. In this embodiment, the apparatus is configured to alter a power state of the first cache after the circuit copies the modified data. The first cache may be at a lower level in a memory hierarchy relative to the second cache. In one embodiment, the circuit is also configured to copy data from the second cache to a third cache or a memory after a particular time interval. In some embodiments, the circuit is configured to copy data while one or more pipeline elements of the apparatus are in a low-power state.

25 Claims, 6 Drawing Sheets

L1 cache 105

| Tag | | M | I |
|---|---|---|---|
| A | Line 122a | 1 | 0 |
|   | Line 122b |   |   |
|   | Line 122c |   |   |
| B | Line 122d | 1 | 1 |
|   | Line 122e |   |   |
|   | Line 122f |   |   |

| Tag | | M | I |
|---|---|---|---|
|   | Line 122g |   |   |
|   | Line 122h |   |   |
| C | Line 122i | 1 | 0 |
|   | Line 122j |   |   |
|   | Line 122k |   |   |
|   | Line 122l |   |   |

Flush engine 135

Duplicate information 535

| A | 1 | 0 |
|---|---|---|
|   |   |   |
|   |   |   |
| B | 1 | 1 |
|   |   |   |
|   |   |   |

|   |   |   |
|---|---|---|
|   |   |   |
| C | 1 | 0 |
|   |   |   |
|   |   |   |
|   |   |   |

*FIG. 5*

FLUSH ENGINE

BACKGROUND

1. Technical Field

This disclosure relates to computer processors, and, more specifically, to flushing data from one or more processor caches.

2. Description of the Related Art

In order to conserve power in computer processors, unused or under-utilized circuits are often put into a low-power state. For example, circuits may be powered-down or clock gated. In some situations, an entire processor core may be powered down. Processing elements often save their state before powering down. For example, before putting a core into a low-power state, a processor may save modified data in caches in the core.

SUMMARY

Techniques are disclosed related to flushing one or more data caches. In one embodiment an apparatus includes a processing element, a first cache associated with the processing element, and a circuit configured to copy modified data from the first cache to a second cache in response to determining an activity level of the processing element. In this embodiment, the apparatus is configured to alter a power state of the first cache after the circuit copies the modified data. The first cache may be at a lower level in a memory hierarchy relative to the second cache. In one embodiment, the circuit is also configured to copy data from the second cache to a third cache or a memory after a particular time interval. In some embodiments, the circuit is configured to copy data while at least one pipeline element of the apparatus is in a low-power state. This may reduce power consumption compared to software flushing implementations. In some embodiments, the apparatus is configured to maintain information that indicates data in the first cache to be copied. This may also reduce power consumption compared to implementations where all data in the first cache is read during a flush.

In another embodiment, a hardware flush unit in a processor is configured to copy data from a lower-level cache to a higher-level cache in response to an indication that the lower-level cache should enter a low-power state. The flush unit may be configured to invalidate copied entries in the lower-level cache. The flush unit may be configured to abort copying/flushing data in response to various indications.

In one particular embodiment, a flush engine in a processor core is configured to copy data from an L1 cache to an L2 cache in response to determining that a processor core has reached a memory quiescent state. In this embodiment, after waiting a particular time interval, the flush engine is configured to copy data from the L2 data cache to a higher-level cache or a memory. The flush engine may maintain duplicate L1 cache tag and/or flag information in order to snoop modified, valid data from the L1 cache to the L2 cache during a cache flush.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Based on." This term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1A:
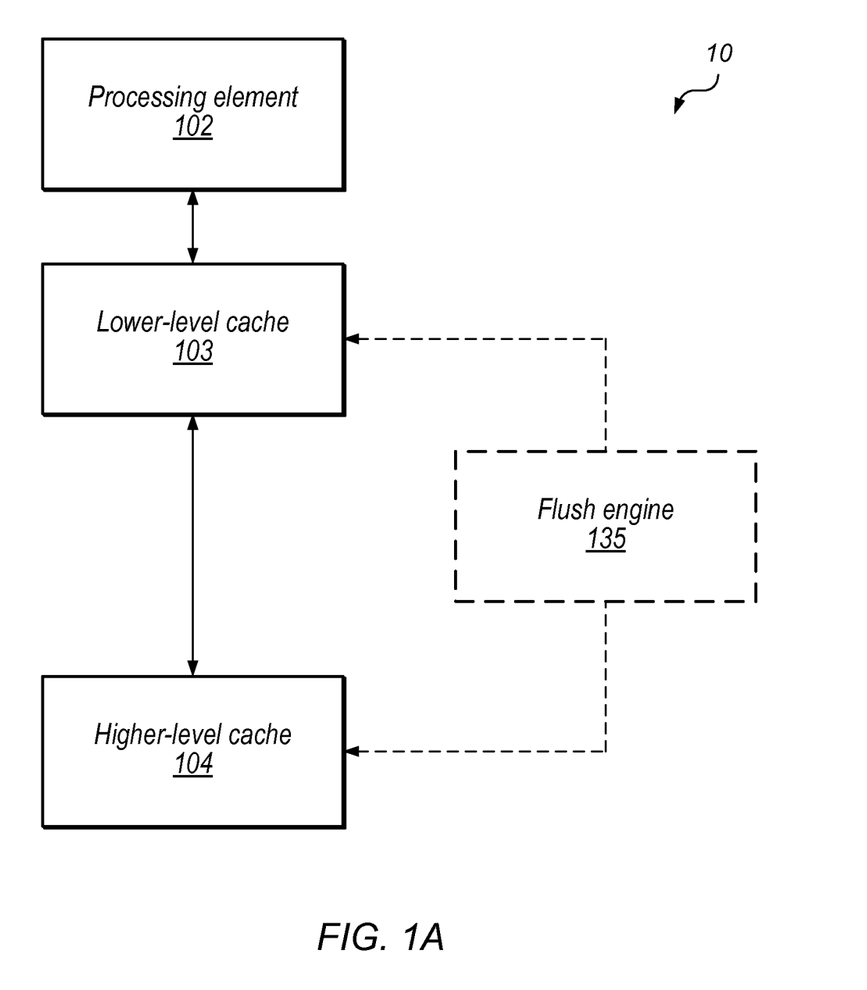
FIG. 1A is a block diagram illustrating one embodiment of a system that includes a flush engine.

Referring now to FIG. 1A, one exemplary embodiment of a system 10 that includes a flush engine is shown. In the illustrated embodiment, system 10 includes processing element 102, lower-level cache 103, higher-level cache 104, and flush engine 135. In one embodiment, lower-level cache 103 is an L1 data cache and higher-level cache 104 is an L2 data cache. In other embodiments, caches 103 and 104 may be any of two relatively higher and lower caches in a given memory hierarchy.

In some embodiments, flush engine 135 is configured to copy modified data from lower-level cache 103 to higher-level cache 104 based on an indication or determination. Such a determination may be of an activity level of processing element 102 or a determination that a processor core associated with lower-level cache 103 is to be powered down. An indication may be an indication that lower-level cache 103 are to be put into a low-power state, or an indication that processing element 102 has reached a memory quiescent state. In one embodiment, in response to such a determination or indication, flush engine 135 is configured to copy modified data from lower-level cache 103 to higher-level cache 104 once processing element 102 is in a state in which it cannot modify data in lower-level cache 103 (e.g., a low-power state or idle state). In order to perform the copy, flush engine 135 may be configured to snoop modified data from lower-level cache 103, which may invalidate snooped cache lines in lower-level cache 103. System 10 may be configured to lower a power state of lower-level cache 103 after flush engine 135 copies the data.

As used here, the term "memory hierarchy" refers to an arrangement of storage elements relative to one or more processing elements. In such an arrangement, if a first element is described as being at a "lower level" of the hierarchy than a second element, the first element is "closer" to the one or more processing elements than the second element, meaning the first element can be accessed by a processing element more quickly than the second element. For example, the first and second elements might be L1 and L2 caches, respectively. In a different example, the first and second elements might be an L2 cache and main memory, respectively.

Typically, lower-level caches are smaller than higher-level caches and access by a processing element to a lower-level cache takes less time than access to a higher-level cache. Some caches in a memory hierarchy may be shared between multiple processor cores or processing pipelines. Various caches in a memory hierarchy may be write-back or write-through caches. Some higher-level caches may be inclusive of the contents of lower-level caches. In one exemplary embodiment, an L1 data cache is a lowest-level cache in a memory hierarchy, followed by an L2 data cache, and an L3 data cache (the highest-level cache in this embodiment), which is coupled to a memory. The L2 data cache may be shared and may be inclusive of the L1 data cache. The L1 data cache may be located in a load/store unit of a processor core. In other embodiments, memory hierarchies having any of various appropriate cache levels are contemplated.

Processing element 102 may be a pipeline element in a processor or processor core. For example, processing element 102 may be a fetch unit, completion unit, load/store unit, etc. In order to reduce power consumption, various elements of system 10 may be placed into a low-power state. System 10 may be configured to ensure that processing element 102 reaches a memory quiescent state or a particular activity level before putting lower-level cache 103 into a low-power state.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Associated with a processing element is its "power state." As used herein, this term has its ordinary and accepted meaning in the art, which includes a type of characterization of the power being consumed by the processing element. The power state for a particular processing element may be characterized in a variety of ways including, without limitation, an indication of the amount of power being consumed by the element, the amount of circuitry associated with the element that is active (i.e., consuming power), a categorization of the element's power state according to a particular specification or scheme, a clocking state of the element, frequency and/or voltage scaling, and so on. One example of characterization of power consumption according to a specification or standard is the Advanced Configuration and Power Interface (ACPI) specification. APCI defines various global, system (e.g., S0, S1, etc.), processor (e.g., C0, C1, etc.), performance (e.g., P0, P1, etc.), and device states (e.g. D0, D1, etc.). ACPI power states may be controlled by an operating system, while other specifications may define power states that are controlled by firmware, power-management software and/or hardware, and so on. Another example of characterization is based on a clock frequency or availability of a clock to a processing element. Yet another example is characterization based on a voltage level supplied to a processing element or an amount of power (e.g., in Watts) consumed by the processing element. Various other characterizations of power consumption by a processing element may be utilized and are contemplated.

The phrase "altering the power state" refers to changing an element's power state. Such a change can occur in various ways. For example, the power state of a processing element may be changed by powering down some or all of the circuitry in the element. In one embodiment, one or more clocks of a processing element may be altered or disabled. In one embodiment, various clocking states may correspond to various power states of a processing element. In another embodiment, certain functionality of an element may temporarily be suspended to reduce power. In yet another embodiment, a voltage level and/or a clock frequency of a processing element may be scaled. As still another example, the power state of a processing element may be changed by placing it in a different state according to a particular specification (e.g., the ACPI specification described above). In general, dynamic power management (e.g., altering the power state of processing elements allows efficient use of processing resources. Processing elements (and even entire processor cores) that are under-utilized may be placed in a lower power state to reduce power consumption. When available processing elements are over-utilized, processing elements that are not currently available may be powered on to meet processing demand.

A processing element as described herein may be associated with one or more cache units such as an L1 data cache, an L2 data cache, etc. For purposes of this application, a processing element may be described as having reached a "memory quiescent state" when the processing element is not currently capable of modifying data in one or more caches associated with the processing element. In other words, from a particular cache's point of view, a processing element that is currently unable to modify data in the cache is in a memory quiescent state. A processing element may reach a memory quiescent state for various reasons. For example, a processing element may reach a memory quiescent state based on a power state of the processing element (e.g., a processing element in a low-power state may be incapable of currently modifying data in a cache). A processing element may also reach a memory quiescent state while in a normal/operational power state. For example, consider a processing pipeline in which a fetch unit is no longer fetching instructions and all instructions in a completion buffer have retired. In this situation, the processing pipeline is currently unable to modify data in a cache (e.g., until the fetch unit begins fetching more instructions, in which case the pipeline is no longer in a memory quiescent state, regardless of its power state. Similarly, as used herein the term "activity level" refers to an amount of processing being performed by a processing element. For example, a processing element may be in an idle state with no processing work currently being performed. Thus, a processing element that is determined to be at a particular activity level may be unable to currently modify the contents of a particular cache (i.e., may be in a memory quiescent state with respect to that cache).

In the illustrated embodiment, flush engine 135 is shown using dashed lines in order to indicate that flush unit 135 may be located in various locations in different embodiments. In one embodiment, flush engine 135 is located in lower-level cache 103. In one embodiment, flush engine 135 is located in higher-level cache 104. In some embodiments, flush engine 135 is located elsewhere in system 10, e.g., as a stand-alone unit. In these embodiments, flush engine 135 is coupled to one or more of lower-level cache 103 and higher-level cache 104. Thus, in one embodiment, flush engine 135 is configured to read/copy/write data by performing those actions itself (e.g., using control lines) and handling the data. In other embodiments, flush engine 135 is configured to control a cache to perform those actions, in which case the data may not actually be transferred through the flush engine.

In order to flush data, flush engine 135 may be configured to iterate through every index and way of lower-level cache 103 in order to find modified data that is not invalid. In one embodiment, flush engine 135 uses a reverse dictionary or duplicate lower-level cache data to only copy modified data that is not invalid and may not read other cache lines of lower-level cache 103. In one embodiment, after flush engine 135 copies the modified data, system 10 is configured to put lower-level cache 103 into a low-power state.

For example, in a situation in which a processor core is to be powered down, flush engine may wait until the core is no longer processing instructions (and at least a portion of the core may be powered-down). Then, flush engine 135 may copy the modified data, and the lower-level cache may be powered-down. This may reduce processor power consumption compared to copying the modified data using software, because processing element 102 can be in a low-power state while the copying occurs.

In one embodiment, after copying the modified data, flush engine 135 is configured to wait a programmable interval, then copy modified data from higher-level cache 104 to an even higher-level cache or to a memory. The programmable interval may be substantially proportional to the time taken to wake processing element 102 from a low-power state. After flush engine 135 copies data from higher level cache 104, system 10 (or some element thereof such as flush engine 135) may put higher-level cache 104 into a lower power state. In some embodiments, flush engine 135 may be configured to similarly flush modified data through other cache levels in a memory hierarchy. For example, flush engine 135 may be configured to flush three, four, or more cache levels in a given memory hierarchy.

Figure 1B:
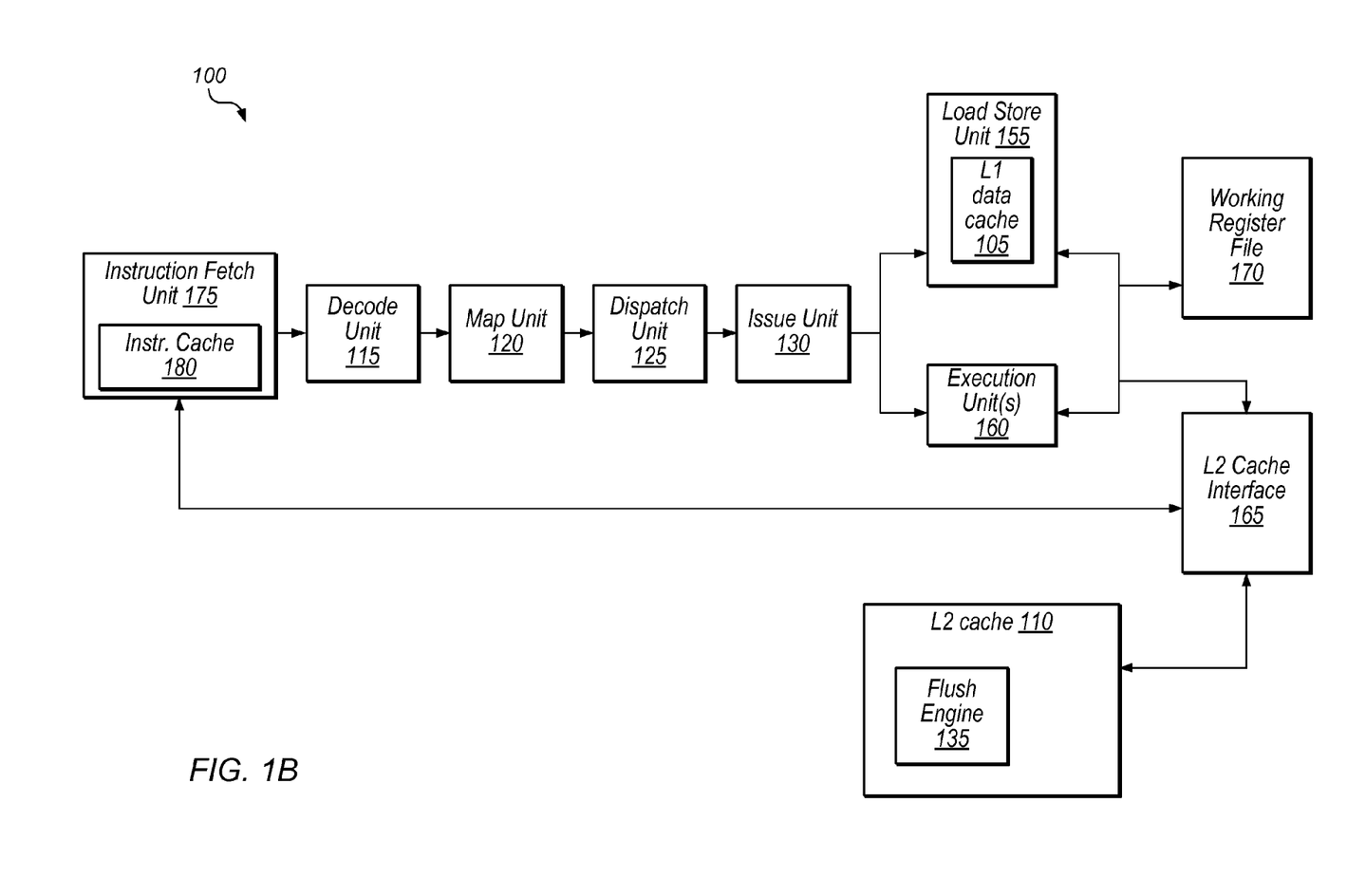
FIG. 1B is a block diagram illustrating one exemplary embodiment of a system that includes a processing pipeline.

Referring now to FIG. 1B, one embodiment of a system 100 that includes a processing pipeline is shown. In the illustrated embodiment, system 100 includes instruction fetch unit (IFU) 175 which includes an instruction cache 180. IFU 175 is coupled to an exemplary instruction processing pipeline that begins with a decode unit 115 and proceeds in turn through a map unit 120, a dispatch unit 125, and issue unit 130. Issue unit 130 is coupled to issue instructions to any of a number of instruction execution resources: execution unit(s) 160, a load store unit (LSU) 155, and/or a floating-point/graphics unit (not shown). These instruction execution resources are coupled to a working register file 170. Additionally, LSU 155 is coupled to L2 cache interface 165 which is in turn coupled to L2 cache 110. L2 cache 110 includes flush engine 135.

In the following discussion, exemplary embodiments of each of the structures of the illustrated embodiment of system 100 are described. However, it is noted that the illustrated embodiment is merely one example of how system 100 may be implemented. Alternative configurations and variations are possible and contemplated.

Instruction fetch unit 175 may be configured to provide instructions to the rest of system 100 for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

In one embodiment, IFU 175 is configured to fetch instructions from instruction cache 180 and buffer them for downstream processing, request data from a cache or memory through L2 cache interface 165 in response to instruction cache misses, and predict the direction and target of control transfer instructions (e.g., branches). In some embodiments, IFU 175 may include a number of data structures in addition to instruction cache 180, such as an instruction translation lookaside buffer (ITLB), instruction buffers, and/or structures configured to store state that is relevant to thread selection and processing (in multi-threaded embodiments of system 100).

In one embodiment decode unit 115 is configured to prepare fetched instructions for further processing. Decode unit 115 may be configured to identify the particular nature of an instruction (e.g., as specified by its opcode) and to determine the source and destination registers encoded in an instruction, if any. In some embodiments, decode unit 115 is configured to detect certain dependencies among instructions and/or to convert certain complex instructions to two or more simpler instructions for execution.

Register renaming may facilitate the elimination of certain dependencies between instructions (e.g., write-after-read or "false" dependencies), which may in turn prevent unnecessary serialization of instruction execution. In one embodiment, map unit 120 is configured to rename the architectural destination registers specified by instructions of a particular instruction set architecture (ISA) by mapping them to a physical register space, resolving false dependencies in the process. In some embodiments, map unit 120 maintains a mapping table that reflects the relationship between architectural registers and the physical registers to which they are mapped. Map unit 120 may also maintain a "free list" of available (i.e. currently unmapped) physical registers.

Once decoded and renamed, instructions may be ready to be scheduled for performance. In the illustrated embodiment, dispatch unit 125 is configured to schedule (i.e., dispatch) instructions that are ready for performance and send the instructions to issue unit 130. In one embodiment, dispatch unit 125 is configured to maintain a schedule queue that stores a number of decoded and renamed instructions as well as information about the relative age and status of the stored instructions. For example, taking instruction dependency and age information into account, dispatch unit 125 may be configured to pick one or more oldest instructions that are ready for performance.

Issue unit 130 may be configured to provide instruction sources and data to the various execution units for picked (i.e. scheduled or dispatched) instructions. In one embodiment, issue unit 130 is configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, system 100 includes a working register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 is similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, system 100 may include any number of integer execution units, and the execution units may or may not be symmetric in functionality.

Load store unit 155 may be configured to process data memory references, such as integer and floating-point load and store instructions and other types of memory reference instructions. In the illustrated embodiment, LSU 155 includes L1 data cache 105. LSU 155 may include as logic configured to detect misses in L1 data cache 105 and to responsively request data from L2 cache 110 and/or a memory through L2 cache interface 165. In one embodiment, L1 data cache 105 is configured as a set-associative, write-back cache. The actual computation of addresses for load/store instructions may take place within one of the integer execution units, though in other embodiments, LSU 155 may implement dedicated address generation logic. In some embodiments, LSU 155 may implement a hardware prefetcher configured to predict and prefetch data that is likely to be used in the future, in order to increase the likelihood that such data will be resident in a data cache when it is needed.

In various embodiments, LSU 155 may implement a variety of structures configured to facilitate memory operations. For example, LSU 155 may implement a data TLB to cache virtual data address translations, as well as load and store buffers configured to store issued but not-yet-committed load and store instructions for the purposes of coherency snooping and dependency checking LSU 155 may include a miss buffer configured to store outstanding loads and stores that cannot yet complete, for example due to cache misses. In one embodiment, LSU 155 may implement a store queue configured to store address and data information for stores that have committed, in order to facilitate load dependency checking LSU 155 may also include hardware configured to support atomic load-store instructions, memory-related exception detection, and read and write access to special-purpose registers (e.g., control registers).

A floating-point/graphics unit (FGU, not shown) may be configured to perform and provide results for certain floating-point and graphics-oriented instructions defined in the implemented ISA. For example, in one embodiment a FGU implements single- and double-precision floating-point arithmetic instructions compliant with the IEEE floating-point standards, such as add, subtract, multiply, divide, and certain transcendental functions.

L2 cache 110 is one embodiment of higher-level cache 104 and L1 data cache 105 is one embodiment of lower-level cache 103 of FIG. 1A. In the illustrated embodiment, L2 cache 110 includes flush engine 135. In other embodiments, flush engine 135 may be located elsewhere in system 100, such as in LSU 155 or L2 cache interface 165, for example.

In one embodiment, system 100 may enter a low-power state. This may occur based on an instruction fetched by IFU 175 or some other indication, for example. In some embodiments, an entire processor core associated with system 100 may be put into a low-power state. It may be desirable to save the state of various elements of system 100 before entering a low-power state. In some embodiments, flush engine 135 is configured to copy data from L1 data cache 105 to L2 cache 110. In order to reduce power consumption, other elements of system 100 may be put into a low-power state before such a flushing of L1 data cache 105 is completed. For example, IFU 175, working register file 170, and/or some portions of LSU 155 (i.e., portions other than L1 data cache 105) may be put into a low-power state before or during the flush. A power-management unit (not shown) may be configured to put various elements of system 100 into a low-power state.

Flush engine 135 may be configured to copy data from L1 data cache 105 to L2 cache 110 based on various indications. In one embodiment, a power-management unit is configured to indicate to flush engine 135 that a flush should occur. In some embodiments, it is determined that a flush should occur based on system 100 reaching a memory quiescent state and/or based on an activity level of system 100. For example, system 100 may be in a memory quiescent state when IFU 175 is no longer fetching instructions and all currently-fetched instructions have been retired (e.g., when a completion buffer is empty). Flush engine 135 or another processing element of system 100 may case L1 cache 105 to enter a low-power state after flushing is complete.

In one embodiment, after flushing L1 data cache 105, flush engine 135 is configured to wait for a time interval, then begin flushing L2 cache 110 to a higher-level cache or to a memory. The time interval may be programmable. The time interval may roughly correspond to a time interval required to bring system 100 out of a low-power state. This implementation may allow for more efficient wake-up of a processor core when it is brought out of a low-power state relatively quickly after being put into the low-power state. Flush engine 135 may determine what data in L2 cache 110 is modified and not invalid and copy such data to the higher-level cache (e.g., an L3 cache) or a memory (e.g., a system random access memory). Flush engine 135 may mark entries in L2 cache 110 as invalid after copying the entries. This may prevent errors in situations where a flush is aborted before being completed (e.g., when system 100 is brought out of a low-power state). Flush engine 135 or another processing element of system 100 may cause L2 cache 110 to enter a low-power state after flushing is complete.

The functionality described herein with reference to FIG. 1B may be implemented using various levels of caches in a memory hierarchy. The embodiment of FIG. 1B includes an L1 cache and L2 cache for illustrative purposes, but in other embodiments, other cache levels may be included and flush engine 135 may copy data between caches in various situations. Flush engine 135 may be put into a low-power state after flushing of a particular cache level is complete. For example, in the embodiment of FIG. 1B, a power management unit may be configured to put flush engine 135 into a low-power state after flushing L2 cache 110.

In various embodiments, any of the units illustrated in FIG. 1B may be implemented as one or more pipeline stages, to form an instruction execution pipeline of a processing element that begins when thread fetching occurs in IFU 175 and ends with commitment of results of instruction execution. Depending on the manner in which the functionality of the various units of FIG. 1B is partitioned and implemented, different units may require different numbers of cycles to complete their portion of instruction processing. In some instances, certain units may require a variable number of cycles to complete certain types of operations.

Figure 2:
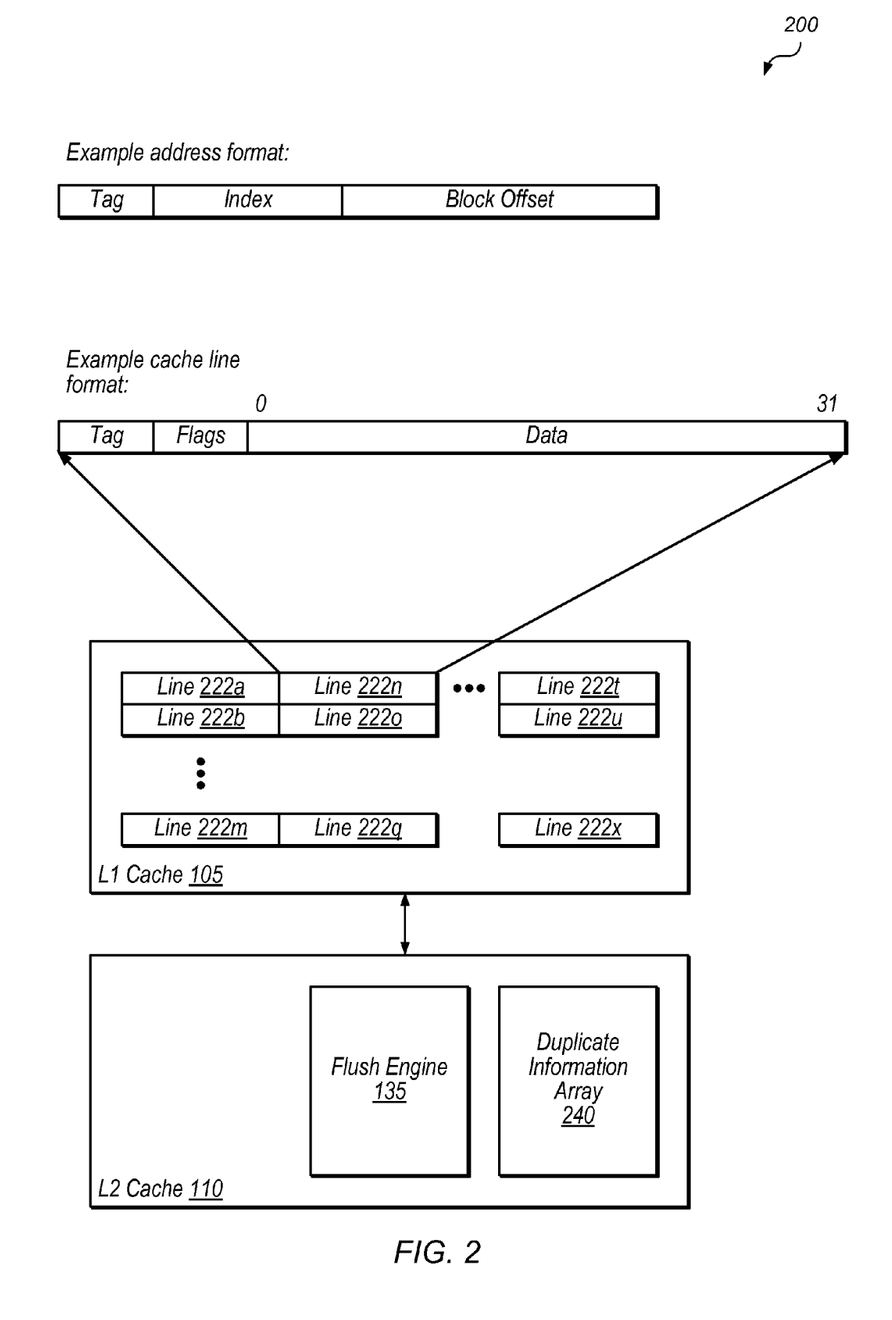
FIG. 2 is a block diagram illustrating one exemplary embodiment of a system that includes duplicate cache information.

Referring now to FIG. 2, one embodiment of a system 200 that includes duplicate cache information is shown. In the illustrated embodiment, system 200 includes L1 cache 105 and L2 cache 110. In the illustrated embodiment, L1 cache 105 includes a plurality of cache lines 222*a-x* organized into a plurality of indices and ways. L1 cache 105 may be organized into any of various appropriate numbers of indices and ways, including implementations having only a single way. In the illustrated embodiment, L2 cache 110 includes flush engine 135 and duplicate information array 240.

FIG. 2 also shows one embodiment of an address format, in which an address includes a tag portion, index portion, and block offset portion. In the illustrated the most significant bits of an address make up the tag. In one embodiment, addresses used to access the cache are physical addresses, i.e., any translation from a virtual address to a physical address is performed before accessing the cache. In other embodiments, a cache may virtually indexed and physically tagged, or virtually indexed and tagged. In the illustrated embodiment, the index is used to select a horizontal row of L1 cache 105, e.g., the row that includes cache lines 122*b*, 122*o*, and 122*u*. The tag portion of an address is used to determine whether a line in any of the ways of a particular row matches the desired cache line. For example, the tag of an address with an index to the row that includes cache lines 122*b*, 122*o*, and 122*u* might match the tag of line 222*u*, which would result in a cache "hit." The block offset is used to select a block (e.g., a byte) within a cache line.

In the illustrated embodiment, each cache line in L1 cache 105 includes a tag for matching the cache line, flags indicating the state of the cache line (e.g., a MESI, state), and data. In the illustrated embodiment, each cache line includes 32 bytes of data but various other sizes of data are also contemplated. The flag portion may indicate whether the cache line is modified, exclusively owned by a cache, owned by a cache, shared with other caches, or invalid, for example.

In the illustrated embodiment, L2 cache 110 includes flush engine 135 and duplicate information array 240. Flush engine 135 may have access to duplicate information array 240 in order to determine whether lines in L1 cache 105 are to be copied during a given cache flush. For example, duplicate information array 240 may include duplicate tags or a reverse dictionary of L1 cache tags. Such information may also be referred to as a "snoop tag array." Duplicate information array 240 may include information indicating whether lines in L1 cache 105 are modified or invalidated. In one embodiment, duplicate information array 240 includes duplicate tag and flag portions for every cache line in L1 cache 105. In this embodiment, flush engine 135 may be configured to read only cache lines from L1 cache 105 that are modified and not invalid.

In another embodiment, L2 cache 110 does not include duplicate information array 240. In this embodiment, flush engine 135 is configured to read every index and way in L1 cache 105 in order to determine which lines are modified and not invalid in order to copy such lines to L2 cache 110. In some embodiments, flush engine 135 includes a counter that is used to iterate through indices and ways of L1 cache 105, including both embodiments where L2 cache 110 includes duplicate information array 240 and embodiments where it does not.

As described above with reference to FIG. 1B, in some embodiments flush engine 135 is also configured to copy modified data from L2 cache 110 to a higher-level cache or memory. Flush unit 135 may include duplicate information for L2 cache 110, and/or any other caches that flush unit 135 is configured to flush.

Figure 3:
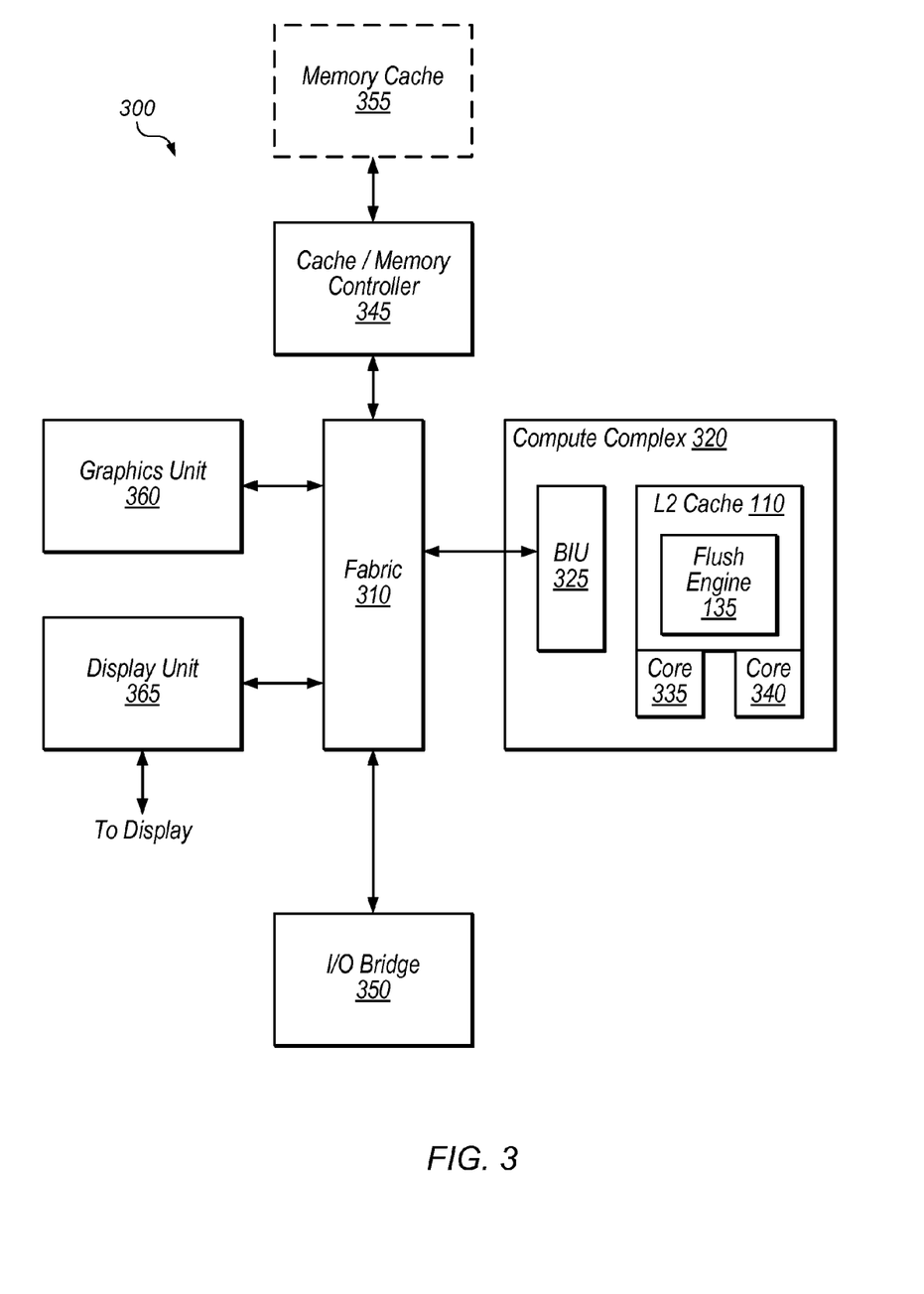
FIG. 3 is a block diagram illustrating one exemplary embodiment of a computing system that includes a flush engine.

Referring now to FIG. 3, one exemplary embodiment of a system 300 that includes a flush engine and multiple processor cores is shown. In some embodiments, elements of system 300 may be included in a system on a chip. In the illustrated embodiment, system 300 includes fabric 310, compute complex 320, input/output (I/O) bridge 350, cache/memory controller 345, graphics unit 360, and display unit 365.

Fabric 310 may include various interconnects, buses, MUX's, controllers, etc., and may be configured to facilitate communication between various elements of system 300. In some embodiments, portions of fabric 310 may be configured to implement various different communication protocols. In other embodiments, fabric 310 may implement a single communication protocol and elements coupled to fabric 310 may convert from the single communication protocol to other communication protocols internally.

In the illustrated embodiment, compute complex 320 includes bus interface unit (BIU) 325, cache 330, and cores 335 and 340. In various embodiments, compute complex 320 may include any of various appropriate numbers of cores and/or caches. For example, compute complex 320 may include 1, 2, or 4 processor cores, or any other suitable number. In one embodiment, cache 330 is a set associative L2 cache. In the illustrated embodiment, L1 cache 110 includes flush engine 135, but in other embodiments flush engine 135 may be located elsewhere in system 300, such as in fabric 210, BIU 325, or cache/memory controller 345, for example. In some embodiments, cores 335 and/or 340 may include internal instruction and/or data caches. In some embodiments, a coherency unit (not shown) in fabric 310, cache 330, or elsewhere in system 300 may be configured to maintain coherency between caches of system 300. BIU 325 may be configured to manage communication between compute complex 320 and other elements of system 300. Processor cores such as cores 335 and 340 may be configured to execute instructions of a particular instruction set architecture (ISA) such as ARM®, INTEL® 64, IA-32, AMD 64®, POWERPC®, or MIPS®, for example.

Cache/memory controller 345 may be configured to manage transfer of data between fabric 310 and one or more caches and/or memories. For example, cache/memory controller 345 may be coupled to an L3 cache, which may in turn be coupled to a system memory. In other embodiments, cache/memory controller 345 may be directly coupled to a memory. In some embodiments, cache/memory controller 345 may include one or more internal caches.

As used herein, the term "coupled to" may indicate one or more connections between elements, and a coupling may include intervening elements. For example, in FIG. 3, compute complex 320 may be described as "coupled to" display unit 365 through fabric 310. In contrast, in the illustrated embodiment of FIG. 3, compute complex 320 is "directly coupled" to fabric 310 because there are no intervening elements.

Graphics unit 360 may include one or more processors and/or one or more graphics processing units (GPU's). Graphics unit 360 may receive graphics-oriented instructions, such OPENGL® or DIRECT3D® instructions, for example. Graphics unit 360 may execute GPU instructions or perform other operations based on the received graphics-oriented instructions. Graphics unit 360 may generally be configured to process large blocks of data in parallel and may build images in a frame buffer for output to a display. Graphics unit 360 may include transform, lighting, triangle, and/or rendering engines in one or more graphics processing pipelines. Graphics unit 360 may output pixel information for display images.

Display unit 365 may be configured to read data from a frame buffer and provide a stream of pixel values for display. Display unit 365 may be configured as a display pipeline in some embodiments. Additionally, display unit 365 may be configured to blend multiple frames to produce an output frame. Further, display unit 365 may include one or more interfaces (e.g., MIPI® or embedded display port (eDP)) for coupling to a user display (e.g., a touchscreen or external display).

I/O bridge 350 may include various elements configured to implement: universal serial bus (USB) communications, security, audio, and/or low-power always-on functionality, for example. I/O bridge 350 may be referred to as a "south bridge" in some implementations. I/O bridge 350 may also include interfaces such as pulse-width modulation (PWM), general-purpose input/output (GPIO), serial peripheral interface (SPI), and/or inter-integrated circuit (I2C), for example.

Flush engine 135 may be configured to flush data from various caches in system 300, including L2 cache 110, memory cache 355, and caches in cores 335 and 340 for example. For example, consider a situation in which core 340 is put into a low-power state. In this exemplary situation, flush engine 135 may flush data from an L1 cache in core 240 to L2 cache 110 and the L1 cache may be powered down. If core 335 is then put into a low-power state, flush engine 135 may also copy data from an L1 cache in core 335 to L2 cache 110 and the L1 cache may be powered down. At this point, since both cores associated with L2 cache 110 have reached a memory quiescent state, flush engine 135 may flush data from L2 cache 110 to memory cache 355, which may in turn write the data to system memory at some point. At this point, L2 cache 110 and flush engine 135 may also be powered down. The various power functions described herein may be performed by a power management unit of system 300.

Figure 4A:
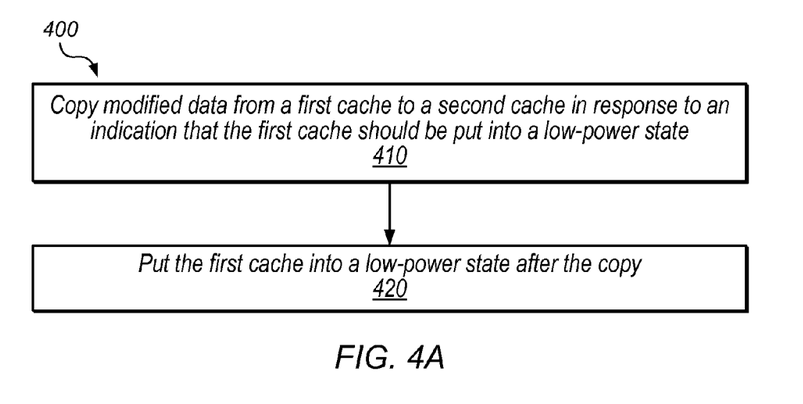
FIGS. 4A and 4B are flow diagrams illustrating respective exemplary embodiments of methods for flushing one or more caches.

Referring now to FIG. 4A, one exemplary embodiment of a method 400 for flushing a cache is shown. The method shown in FIG. 4A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, modified data is copied from a first cache to a second cache in response to an indication that the first cache is to be put into a low-power state. The indication may be based on a processing element reaching a memory quiescent state or a particular activity level of a processing element, for example. The modified data may be copied by reading every cache line in the first cache, or by reading only modified, valid cache lines in the first cache. The second cache may be a shared cache. Flush engine 135 may invalidate lines or entries in the first cache after copying data from those lines or entries. Flow proceeds to block 420.

At block 420, the first cache is put into a low-power state after the copying of block 410. Method 400 may reduce power consumption compared to software methods for cache flushing. This reduction may result from other processing elements being in a low-power state while a flush is occurring. Flow ends at block 420.

Figure 4B:
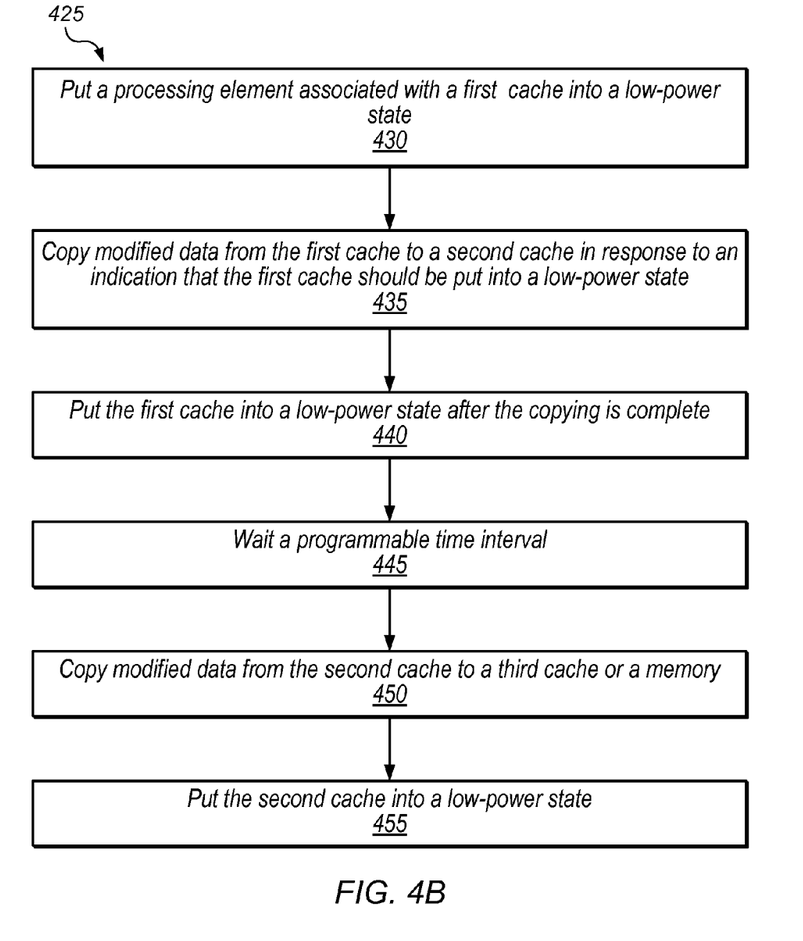

Referring now to FIG. 4B, one exemplary embodiment of a method 425 for flushing caches is shown. The method shown in FIG. 4B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 430.

At block 430, a processing element associated with a first cache is put into a low-power state. For example, a fetch unit, a decode unit, execution units, etc. may be powered-down. This operation may result in or follow upon a processing element reaching a memory quiescent state or a particular activity level. Flow proceeds to block 435.

At block 435, modified data is copied from the first cache to a second cache in response to an indication that the first cache is to be put into a low-power state. The indication may be based on a processing core reaching a memory quiescent state or a particular activity level of a processing element, for example. The modified data may be copied by reading every cache line in the first cache, or by reading only modified, valid cache lines in the first cache. The second cache may be a shared cache. Flush engine 135 may invalidate lines or entries in the first cache after copying data from those lines or entries. Flow proceeds to block 440.

At block 440, the first cache is put into a low-power state after the copying is complete. In one embodiment, flush engine 135 is configured to put the first cache into a low-power state. In another embodiment, a power management unit is configured to put the first cache into a low-power state. Flow proceeds to block 445.

At block 445, a programmable interval occurs before proceeding to block 450. The programmable interval may be roughly proportion to a time interval required to bring the processing element of block 430 to an active state. Flow proceeds to block 450.

At block 450, modified data is copied from the second cache to a third cache or memory. The copying of block 450 may be performed by a flush engine that is also configured to perform the copying of block 435. Flow proceeds to block 455.

At block 455, the second cache is put into a low-power state. In some embodiments, the second cache is shared between multiple processor cores. The second cache may be put into the low-power state based on a determination that all cores associated with the second cache are in a low-power state. The second cache may be brought out of the low-power state based on a determination that one or more processing elements associated with the second cache is no longer in a low-power state. Flow ends at block 455.

Figure 5:
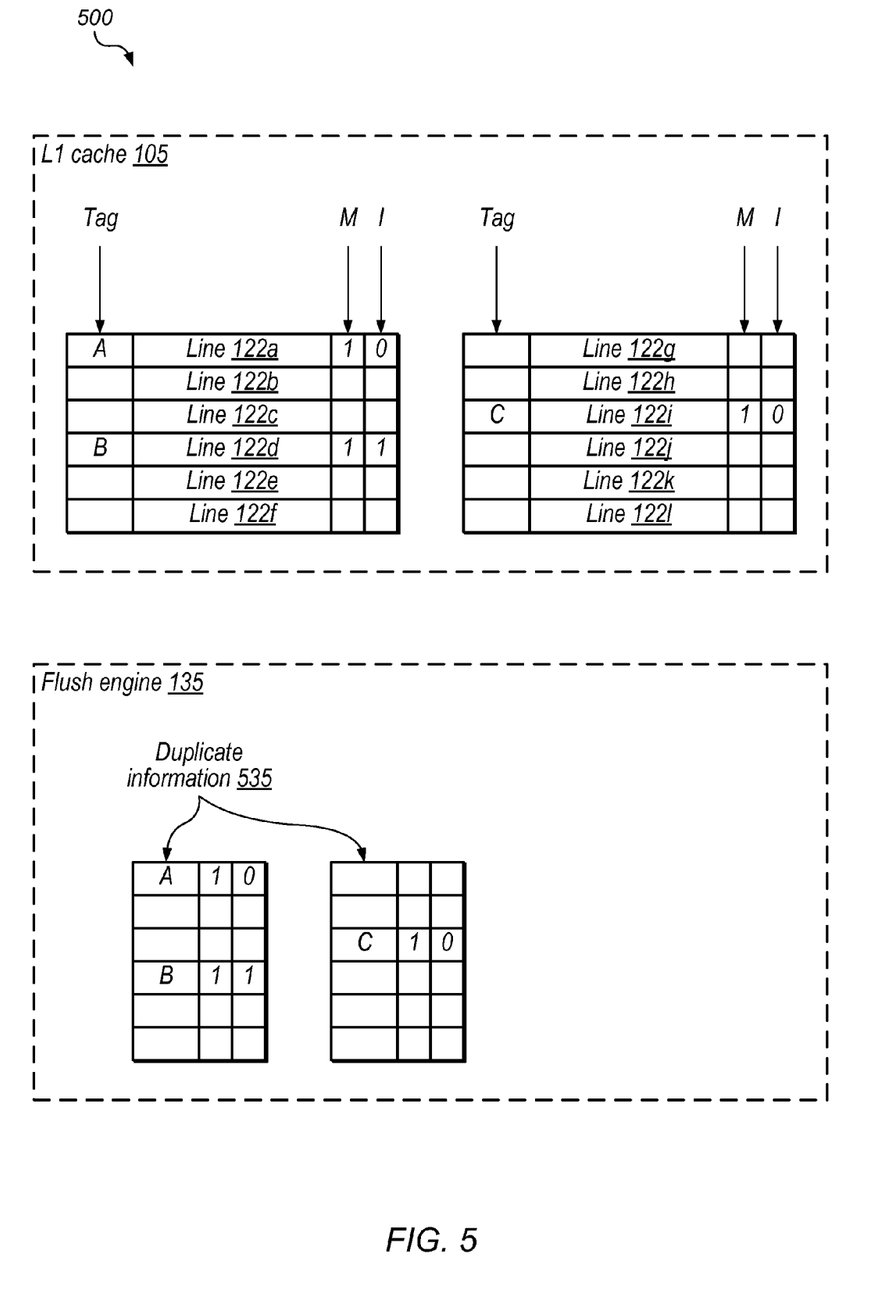
FIG. 5 is a diagram illustrating one exemplary state of a cache before a cache flush.

Referring now to FIG. 5, an exemplary situation prior to a cache flush in one embodiment of a system 500 is shown. In the illustrated situation, system 500 includes L1 cache 105 and flush engine 135.

In the illustrated embodiment, L1 cache 105 includes cache lines 122a j, organized in two ways. Line 122a includes tag A, and its modified (M) and invalid (I) bits indicate that the line is modified and valid. Line 122d includes tag B, and is modified and invalid. Line 122*i* includes tag C and is modified and valid. It is assumed that all the other lines in L1 cache 105 are not modified or are invalid.

In the illustrated embodiment, flush engine 135 includes duplicate information 535. In the illustrated embodiment, duplicate information 535 includes tag and flag information for lines in L1 cache 105. Based on the duplicate information 535, flush engine 135 may be configured to copy lines 122*a* and 122*i* to a higher-level cache such as the L2 cache 110 described above with reference to FIGS. 1-3 (e.g., because lines 122*a* and 122*i* are modified and valid). In this embodiment, flush engine may be configured to only read lines 122*a* and 122*i* from L1 cache 105. This may save power and result in a faster flush of L1 cache 105 compared to embodiments in which flush engine 135 reads all the lines in L1 cache 105 to determine which lines are to be saved to a higher-level cache before putting L1 cache 105 into a low-power state.

In some embodiments, duplicate information 535 may be stored in flush engine 135 as shown. In other embodiments, duplicate information 535 may be stored elsewhere and may be available to flush engine 135. The M and I bits are shown separately for illustrative purposes, but in various embodiments state information associated with cache lines may be represented using any of various encodings.

In some embodiments, flush engine 135 is configured to mark lines in L1 cache 105 as invalid after copying the lines. Thus, in the event that a flush is aborted (e.g., because a core is brought out of a low-power state), flush engine 135 may be configured to stop copying modified data and system 500 can resume processing using L1 cache 105 without errors caused by incorrect flag information.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a processing element that includes an execution pipeline configured to execute instructions;
   a first cache associated with the processing element and configured to cache data accessed by instructions executed by the execution pipeline; and
   a circuit coupled to the first cache and configured, in response to determining that the execution pipeline is in a low-power state in which it is not configured to access the first cache, to copy modified data from the first cache to a second cache;
   wherein the apparatus is configured to alter a power state of the first cache after the circuit copies the modified data.

2. The apparatus of claim 1, wherein the first cache is a lower level cache in a memory hierarchy than the second cache.

3. The apparatus of claim 1, wherein the circuit is further configured to:
   determine that a particular time interval has passed after altering the power state of the first cache; and
   copy modified data from the second cache to a third cache or to a storage element after determining that the particular time interval has passed.

4. The apparatus of claim 1, wherein the circuit is configured to maintain a copy of tag information for the first cache.

5. The apparatus of claim 1, wherein the apparatus is further configured to maintain information indicative of data in the first cache to be copied before altering the power state of the first cache; and
   wherein the circuit is configured to copy the modified data based on the maintained information.

6. A method, comprising:
   copying, by a hardware flush unit associated with a processing element that includes a first cache, modified data from the first cache to a second cache in response to an indication to put the first cache into a low-power state, wherein the processing element is in a low-power state and is not configured to access the first cache during the copying; and
   putting the first cache into a low-power state after said copying;
   wherein the first cache is at a lower-level in a memory hierarchy than the second cache.

7. The method of claim 6, further comprising:
   traversing a plurality of indices of the first cache and a plurality of ways of at least one of the indices in order to determine whether data stored in the plurality of indices and plurality of ways is to be copied to the second cache.

8. The method of claim 7, wherein the data is to be copied when the data is modified and is not invalid.

9. The method of claim 6, further comprising:
   maintaining, before said copying, information associated with a plurality of data entries in the first cache, wherein the information is indicative of whether each of the plurality of data entries is to be copied.

10. The method of claim 6, wherein the first cache is not shared by multiple processor cores and the second cache is shared by multiple processor cores.

11. A processor, comprising:
    an execution pipeline configured to execute instructions;
    a lower-level cache and a higher-level cache; and
    a hardware flush unit configured to, during a time interval in which the execution pipeline is in a low-power state in which the execution pipeline is not configured to access the lower-level cache, copy data from the lower-level cache to the higher-level cache in response to an indication that the lower-level cache is to enter a low-power state;
    wherein the processor is configured to put the lower-level cache into a low-power state in response to completion of the hardware flush unit copying the data.

12. The processor of claim 11,
    wherein the flush unit is further configured to copy data from the higher-level cache to a storage element in a memory hierarchy in response to an end of a programmable interval after copying the data from the lower-level cache to the higher-level cache.

13. The processor of claim 12, wherein the lower-level cache is not shared by multiple processing pipelines and the higher-level cache is shared by multiple processor pipelines.

14. The processor of claim 12, wherein the hardware flush unit is further configured to invalidate entries in the lower-level cache from which the hardware flush unit copied data.

15. The processor of claim 12, wherein the hardware flush unit is configured to abort copying data from the lower-level cache in response to a change in a power state of an associated processing element.

16. A method, comprising:
flushing first data from a first cache to a second cache in response to determining that a processing element that includes or is coupled to the first cache has entered a memory quiescent state;
causing the first cache to enter a low-power state;
flushing data from the second cache to a third cache or to a memory in response to an end of a particular time interval from the flushing the first data; and
causing the second cache to enter a low-power state.

17. The method of claim 16, wherein the particular time interval corresponds to a time interval required to bring the processing element to an active state.

18. The method of claim 16, wherein the second cache is a shared cache.

19. The method of claim 16, further comprising:
invalidating copied entries in the first cache while flushing the first data from the first cache; and
invalidating copied entries in the second cache while flushing the second data from the second cache.

20. The method of claim 16, further comprising:
aborting said flushing second data in response to determining that that the processing element is no longer in a memory quiescent state.

21. A processor core, comprising:
an instruction fetch unit;
an L1 data cache;
an L2 data cache; and
a flush engine configured to:
determine that the processor core has reached a memory quiescent state;
copy modified data from the L1 data cache to the L2 data cache;
wait a particular time interval after determining that the processor has reached a memory quiescent state; and
after waiting the particular time interval, copy data from the L2 data cache to a higher-level cache or to a memory.

22. The processor core of claim 21, wherein the flush engine is configured to copy at least a portion of the modified data from the L1 data cache while the instruction fetch unit is in a low-power state in which the processor core is not configured to access the L1 cache.

23. The processor core of claim 21, wherein the particular time interval is programmable.

24. The processor core of claim 21, wherein the flush engine is further configured to invalidate cache lines associated with modified data copied from the L1 data cache and cache lines associated with modified data copied from the L2 data cache.

25. The processor core of claim 21, wherein the processor core is configured to place the L1 data cache into a low-power state after copying the modified data from the L1 data cache to the L2 data cache.

* * * * *